J. J. ROYLE.
STEAM-TRAP.
No. 188,416. Patented March 13, 1877.
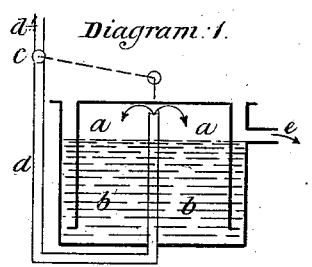
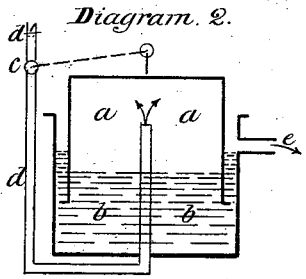
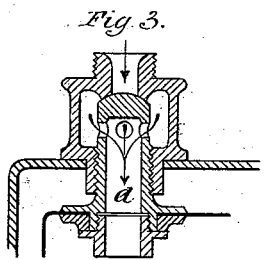
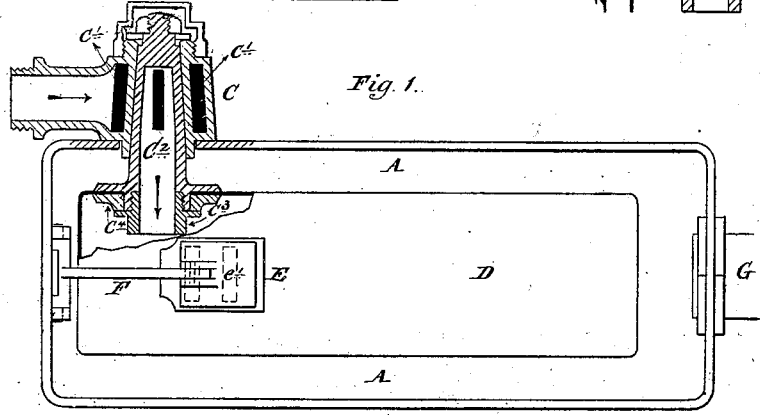
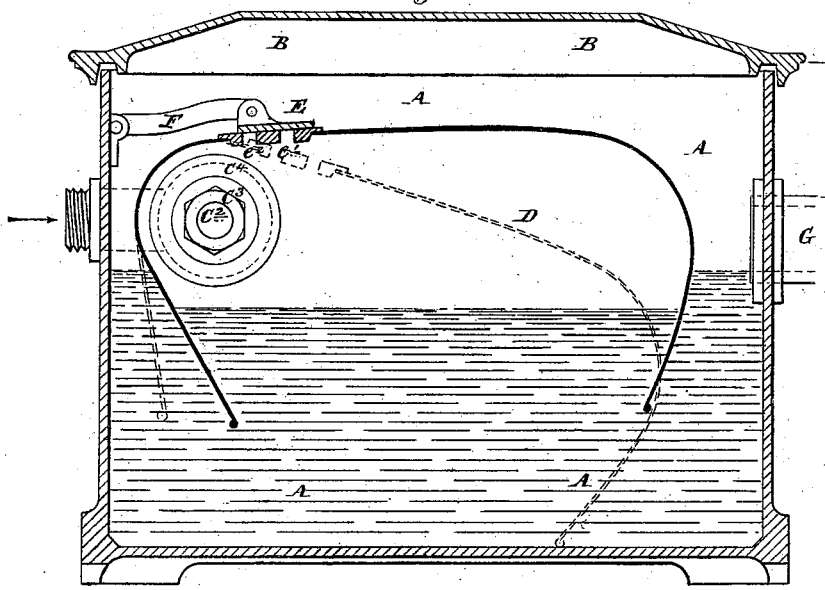
Witnesses
J. S. Wombsley
H. Bibby
Inventor
John James Royle

UNITED STATES PATENT OFFICE.

JOHN JAMES ROYLE, OF MANCHESTER, GREAT BRITAIN.

IMPROVEMENT IN STEAM-TRAPS

Specification forming part of Letters Patent No. 188,415, dated March 13, 1877; application filed August 1, 1876.

*To all whom it may concern:*

Be it known that I, JOHN JAMES ROYLE, of the city of Manchester, in the county of Lancaster, Kingdom of Great Britain and Ireland, have invented a Steam-Trap, of which the following is a specification:

The essential feature of my steam-trap for discharging air and water of condensation from vessels containing steam consists in the employment of an open-bottomed condensing-chamber, (hereinafter called the "condensing-chamber,") fitted to rise and fall in a suitable reservoir of water, (hereinafter called the "reservoir.") Steam is admitted by suitable means into and beneath such condensing-chamber, and the buoyancy thus obtained is employed to actuate the necessary cock or valve in one direction, while the condensation constantly taking place within such condensing-chamber is taken advantage of to actuate such cock or valve in the contrary direction.

The principle upon which my invention is based will be best understood by a consideration of Diagrams 1 and 2, where $a$ is an open-bottomed vessel, which I call the "condensing-chamber," arranged to rise and fall in a reservoir of water, $b$, in a somewhat similar manner to a gas-holder. The top of this condensing-chamber is connected to any convenient form of valve or tap $c$ upon the pipe $d$, the construction of such tap or valve being immaterial so long as it is capable of being opened and closed by the rise and fall of the condensing-chamber $a$ in the reservoir $b$.

If the apparatus is to be used for discharging water of condensation from steam-pipes or other vessels containing steam, the tap or valve $c$ is connected to such vessel by the pipe $d'$, and the outlet end of the pipe $d$ carried up into the interior of the condensing-chamber $a$.

In Diagram 1 the condensing-chamber $a$ is shown in its lowest position, the tap or valve $c$ being open and the apparatus ready for action. If there be any water of condensation in the steam-pipe $d'$, or other vessel to which the apparatus is attached, such water flows out through the open tap or valve $c$ into the interior of the condensing-chamber $a$; but as such condensing-chamber is without bottom, the water entering it simply adds to the quantity of water already contained in the reservoir $b$, the overflow-water escaping by the pipe $e$. As soon, however, as all the water has been discharged, the steam which follows accumulates within the condensing-chamber $a$, gradually displacing the water contained therein through the open bottom into the reservoir $b$, and down the overflow-pipe $e$, until such condensing-chamber becomes buoyant, when it rises to the position indicated in Diagram 2, and so closes the tap or valve $c$. Now, as there is always a slight condensation of steam taking place within the condensing-chamber $a$, such condensing-chamber constantly tends to fall in the reservoir $b$, and open the tap or valve $c$ to a sufficient extent to supply the loss. If any water of condensation should now collect in the pipe $d'$, and this necessary supply of steam be cut off thereby, the condensing-chamber gradually falls and opens the tap or valve $c$ until such water of condensation has been discharged and the steam again arrives, when the condensing-chamber rises once more to its former position.

I will now proceed to describe a form of apparatus for carrying my invention into practical effect.

Figure 1 represents a plan view, and Fig. 2 a side sectional view, of an apparatus for discharging air and water of condensation from vessels containing steam, such apparatus being technically known as a "steam-trap."

In all the views, A is a reservoir, which is open to the atmosphere at the top, but may be closed by a loose cover, B. C is a plug-cock, the body of which is affixed to the side of the reservoir A, and provided with a surrounding steam-jacket, $C^1$, which not only insures equal expansion throughout, and therefore easy working of the plug $C^2$ at all pressures and temperatures, but facilitates the construction of a number of ports, (say, by preference, two or three,) opening into and corresponding exactly with similar ports formed in the plug $C^2$. By this means a large thoroughfare is obtained through the plug-cock with very little turning of the plug. These ports being formed at equal distances apart around the plug, such plug is pressed alike all round, insuring freedom of working under pressure and equal wearing.

D is the condensing-chamber, which acts as a self-acting key or lever handle for opening the cock C when the condensed water accumulates in the steam-pipes, and for closing the same immediately all the water has escaped therefrom. For this purpose the plug $C^2$ of the cock C passes through and is affixed to the side of the condensing-chamber D by the clamping-nut $C^3$ and washer $C^4$, and being formed hollow throughout, such plug so opens into the interior of the condensing-chamber D, and forms an outlet therethrough for the condensed water to fall direct from such hollow plug into the reservoir A in the direction of the arrow. The water in the reservoir is at the same level both inside and outside such condensing-chamber D, so long as it occupies the lowest position indicated by the dotted lines, in which position the front port $e^1$ of the air-valve E is drawn open by its connecting-link F, hinged to the end of the reservoir A. Any air in the steam-pipes, to which the inlet end of the cock C is connected, is thus free to escape through the condensing-chamber D and open air-valve E into the outer atmosphere, and the condensed water simply falls among and adds to the quantity of water in the reservoir A, the overplus flowing away by the outlet-pipe G. All the water having thus escaped, the steam which follows depresses the level of the water under the condensing-chamber D by accumulating beneath it, rendering it sufficiently buoyant to rise, and in so doing not only shuts the air-valve E, but at the same time, by turning the plug $C^2$, closes the plug-cock C, and so prevents any further escape of steam. The subsequent action is obtained by the condensing-chamber having a constant tendency to settle down in the reservoir, owing to the condensation of steam under it, so that should any water collect in the steam-pipes and the small quantity of steam necessary to supply the loss by condensation become cut off thereby, the condensing-chamber D gradually falls and reopens the cock C, to permit such water to run out until the steam once more arrives, and so raises the condensing-chamber D and again closes the cock C.

The back port $e^2$ of the air-valve E is provided for the purpose of relieving the condensing-chamber in case by any accident it should rise too far.

Instead of a plug-cock it will be obvious that a valve actuated by a screwed spindle may be employed, as seen in Fig. 3, the hollow screwed spindle $a$ being connected to the condensing-chamber D, so that as it rises in the reservoir A the valve $b$ is closed against its seating, and vice versa.

It will thus be seen that the reservoir of my improved steam-trap is open to the atmosphere, being simply closed by a loose cover, so that in case of the tap or valve being out of order, ready access may be obtained to the same without loss of time.

I wish it to be understood, although I have only shown my invention of a condensing-chamber as applied to actuating the plug of a plug-cock, that it is equally applicable for rotating the body of a plug-cock upon a fixed horizontal plug for the same purpose.

I prefer to construct the condensing-chamber hereinbefore described of sheet metal, say copper, and the reservoirs of cast-iron; and to insure such condensing-chamber always falling, it should in no case be made absolutely steam-tight, a slight leakage being advantageous in permitting the escape of any air which may from time to time come over with the steam.

I claim—

1. An inverted condensing-chamber, D, with the open end downward and immersed in the water of the reservoir, in combination with such reservoir, and the cock or valve opening into the interior of the condensing-vessel, substantially as and for the purposes set forth.

2. The air-valve E, in combination with the open-bottom condensing-chamber D and cock C, substantially as and for the purposes set forth.

JOHN JAMES ROYLE.

Witnesses:
GEORGE H. RICHMOND,
FRED. BIBBY.